US009784334B2

(12) United States Patent
Reinke et al.

(10) Patent No.: US 9,784,334 B2
(45) Date of Patent: Oct. 10, 2017

(54) HYDROMOUNT

(75) Inventors: Florian Reinke, Hannover (DE);
Michael Klettke, Hannover (DE);
Diethard Schneider, Nienhagen (DE)

(73) Assignee: ContiTech Vibration Control GmbH, Hannover (DE)

( * ) Notice: Subject to any disclaimer, the term of this patent is extended or adjusted under 35 U.S.C. 154(b) by 1154 days.

(21) Appl. No.: 13/090,872

(22) Filed: Apr. 20, 2011

(65) Prior Publication Data

US 2011/0221106 A1    Sep. 15, 2011

Related U.S. Application Data

(63) Continuation of application No. PCT/EP2009/062241, filed on Sep. 22, 2009.

(30) Foreign Application Priority Data

Oct. 20, 2008    (DE) .................. 10 2008 037 471

(51) Int. Cl.
*F16F 13/10*    (2006.01)

(52) U.S. Cl.
CPC .................................. *F16F 13/106* (2013.01)

(58) Field of Classification Search
USPC .................. 267/140.11–140.15, 140.2–140.5
See application file for complete search history.

(56) References Cited

U.S. PATENT DOCUMENTS

| | | | | |
|---|---|---|---|---|
| 4,742,999 A | * | 5/1988 | Flower | 267/140.13 |
| 4,781,362 A | * | 11/1988 | Reuter et al. | 267/219 |
| 5,386,973 A | * | 2/1995 | Brenner et al. | 267/140.13 |
| 5,769,402 A | * | 6/1998 | Ide et al. | 267/140.14 |
| 6,499,729 B1 | * | 12/2002 | Walterbusch | 267/140.13 |
| 6,910,683 B2 | * | 6/2005 | Itoh et al. | 267/140.13 |
| 7,258,331 B2 | | 8/2007 | Schneider | |
| 2003/0141640 A1 | * | 7/2003 | Kato | 267/140.11 |
| 2011/0047819 A1 | * | 3/2011 | Pelletier | 36/43 |

FOREIGN PATENT DOCUMENTS

DE    10 2007 014 242 A1    9/2008

OTHER PUBLICATIONS

International Search Report dated Nov. 12, 2009 of international application PCT/EP 2009/062241 on which this application is based.

* cited by examiner

*Primary Examiner* — Anna Momper
(74) *Attorney, Agent, or Firm* — Walter Ottesen, P.A.

(57) ABSTRACT

A hydromount (2) includes: a housing (4) and a compensating diaphragm (6), which enclose a hydraulic volume (8), a partition wall (12), which partitions the hydraulic volume (8) into a working chamber (14) and into a compensating chamber (16). The partition wall (12) contains a transfer channel (18), via which the two chambers (14, 16) are connected to one another, and wherein the partition wall (12) has an opening, in which there is a diaphragm or membrane (20) of flexible, elastomeric material clamped between two components (22, 24), wherein the diaphragm (20) is clamped between the two components (22, 24) in such a way that, as a result of the clamping, a radial pretension is produced in the diaphragm (20).

14 Claims, 10 Drawing Sheets

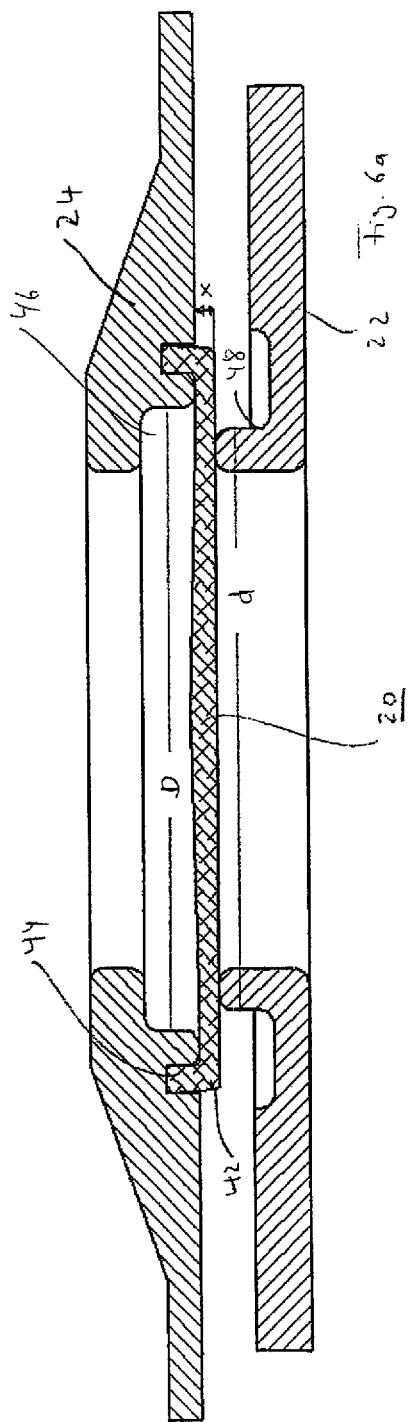

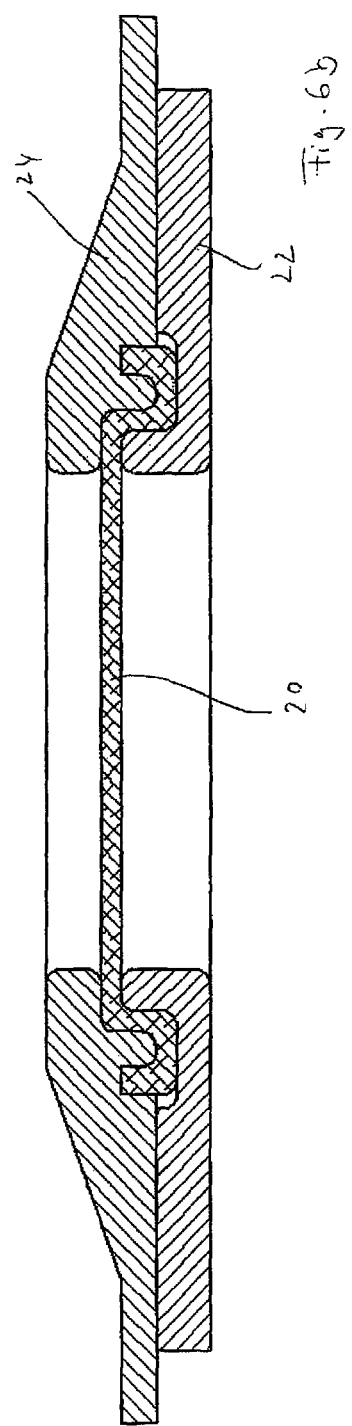

HYDROMOUNT

CROSS REFERENCE TO RELATED APPLICATIONS

This application is a continuation application of international patent application PCT/EP 2009/062241, filed Sep. 22, 2009, designating the United States and claiming priority from German application 10 2008 037 471.7, filed Oct. 20, 2008, and the entire content of both applications is incorporated herein by reference.

FIELD OF THE INVENTION

The invention relates to a hydromount which contains the following components:
- a housing and a compensating diaphragm, which enclose a hydraulic volume,
- a partition wall, which partitions the hydraulic volume into a working chamber and into a compensating chamber,
- wherein the partition wall contains a transfer channel, via which the two chambers are connected to one another, and
- wherein the partition wall has an opening, in which there is a diaphragm of flexible, elastomeric material clamped between two components.

BACKGROUND OF THE INVENTION

A mount of this kind is known from U.S. Pat. No. 7,258,331 B2, for example, and is fitted in motor vehicles between the vehicle engine and chassis, for example. The hydromount is intended to suppress or at least damp vibration transmitted from the engine to the chassis and vice versa. The hydromount is furthermore intended to prevent acoustic vibration in the form of structure-borne noise from reaching the chassis of the vehicle from the engine. For this purpose, the partition wall situated between the working chamber and the compensating chamber has not only the transfer channel but a further opening, in which there is a diaphragm of flexible, elastomeric material clamped between two components. The diaphragm is usually clamped between two displacement limiting elements, which limit the deflection of the diaphragm in the axial direction of the mount.

Radially pretensioning the diaphragm, which is clamped between the two components, is a practice known from U.S. Pat. No. 7,258,331 B2. This has the advantage that particularly well defined disturbing frequencies in the structure-borne noise spectrum can be reduced with the diaphragm. The diaphragm has an edge bead with a reinforcing insert, with the result that the elastomeric material in the center of the diaphragm contracts more after the vulcanization of the diaphragm than in the edge region of the diaphragm, giving rise to the radial pretension. It has been found that the diaphragm known from U.S. Pat. No. 7,258,331 B2 functions particularly well. However, it must be observed that the reinforcing insert has to be introduced into the diaphragm as an additional element, giving rise to additional effort and additional costs. Moreover, the diaphragm could tear in the region of the transition to the edge bead in old hydromounts since the elastomeric material of the diaphragm has a particularly high pretension there.

SUMMARY OF THE INVENTION

It is an object of the invention to provide a hydromount of simple construction which has a very long service life.

The object is achieved by virtue of the fact that the diaphragm is clamped between the two components in such a way that, as a result of the clamping, a radial pretension is produced in the diaphragm.

An advantage achieved with the invention, in particular, is that the hydromount is of simple construction. In particular, the diaphragm can be composed exclusively of flexible, elastomeric material. It is not necessary to introduce additional elements into the diaphragm, for example, to introduce a reinforcing insert. The diaphragm can thus be produced in a simple and economical manner. A further advantage of the invention is the fact that the hydromount has a long service life since the diaphragm is pretensioned uniformly over the entire surface thereof. Finally, a further advantage of the invention is the fact that the diaphragm is simple to manufacture in any desired shape (for example, round, rectangular or oval).

According to another feature of the invention, the diaphragm is clamped between two components in the form of grid plates, which limit the deflection of the diaphragm. An advantage of this development is that the diaphragm is enclosed between two components which are present in any case in the hydromount.

According to another feature of the invention, the diaphragm has an annular bead, which projects beyond at least one surface of the diaphragm, and the component facing this surface has an annular oblique plane, the highest point of which is radially on the inside and by means of which the annular bead is clamped. The advantage of this development is the fact that it is a simple matter to produce a radial pretension in the diaphragm with the aid of a bead, which is clamped by means of an oblique plane.

According to another feature of the invention, the diaphragm has an annular bead, which projects beyond both surfaces of the diaphragm, and the components facing the surfaces each have an annular oblique plane, the highest point of which is radially on the inside and by means of which the annular bead is clamped. An advantage of this development is that it is of no account, during the production of the hydromount, in what orientation the diaphragm is laid and clamped between the two components. There can thus be no production errors. Another advantage of this feature is that a sufficiently large pretension arises in the diaphragm, even with a small pressing displacement of the two components in the axial direction of the hydromount.

According to another feature of the invention, the angle of the oblique plane is between 30° and 60°. An advantage of this development is that, on the one hand, only small forces have to be applied in order to produce a radial pretension in the diaphragm and, on the other hand, a sufficiently large radial pretension is built up in the diaphragm for a given pretensioning displacement between the two components.

According to another feature of the invention, the diaphragm is of cup-shaped design with an annular wall which is slotted into an annular groove in the first component, and the first component has a cup-shaped recess which is surrounded by the groove and into which the second component engages in the manner of a cover by means of an annular projection and thereby radially pretensions the diaphragm. An advantage of this feature is that a defined radial pretension can be set in the diaphragm by way of the height of the projection as shown in the drawings and explained hereinafter with respect thereto.

According to another feature of the invention, the surfaces of the diaphragm are coated with a lubricant. An advantage of this feature is that the friction between the surfaces of the diaphragm and the surfaces of the components between which the diaphragm is clamped is reduced, thereby making it easier to press the diaphragm between the two components.

According to another feature of the invention, the elastomeric material of the diaphragm contains an additive which migrates to the surfaces of the diaphragm after vulcanization of the diaphragm and acts as a lubricant. An advantage of this feature is that the additive can be mixed into the elastomeric material of the diaphragm in a simple manner before vulcanization. Hence, it is not necessary to coat the surfaces of the diaphragm with a lubricant after the production of the diaphragm. Erucamide is preferably used as the lubricant.

According to another feature of the invention, in the principal directions of expansion of the diaphragm, the ratio of the length of the unpretensioned diaphragm in one principal direction of expansion to the additional length produced by the pretension is between 30:1 and 50:1. An advantage of this feature is, on the one hand, the fact that, in the range indicated, a sufficiently large radial pretension in the diaphragm is obtained to ensure good functioning of the hydromount. On the other hand, the diaphragm is not pretensioned radially to such an extent that it might be damaged in the course of the service life of the hydromount owing to the radial pretension.

According to another feature of the invention, the amount of pretension differs in percentage terms in the principal directions of expansion of the diaphragm. An advantage of this feature is that structure-borne vibration can be damped over a particular broadband frequency range.

BRIEF DESCRIPTION OF THE DRAWINGS

The invention will now be described with reference to the drawings wherein:

FIGS. 6a and 6b show a diaphragm clamped between two grid plates.

DESCRIPTION OF THE PREFERRED
EMBODIMENTS OF THE INVENTION

Figure 1:
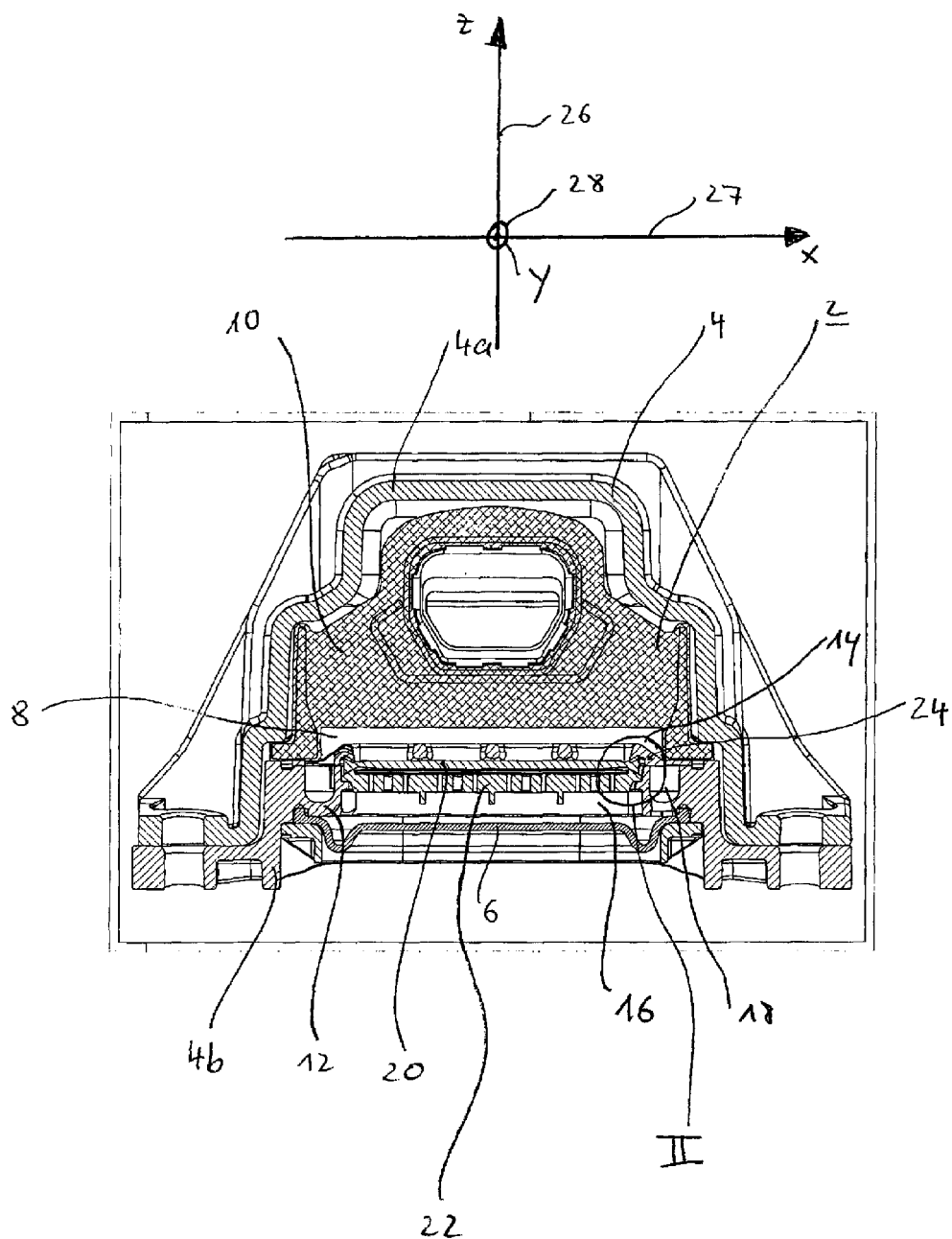
FIG. 1 shows a hydromount in a systematic view.

FIG. 1 shows a hydromount 2 in longitudinal section. The hydromount 2 has a housing 4 comprising the two housing parts 4a and 4b, in which there is a hydraulic volume 8. The hydraulic volume 8 is closed off at one end of the hydromount 2 (referred to below as the upper end) by an elastomeric supporting spring 10 and, at the other end of the hydromount 2 (referred to below as the lower end) by a flexible compensating diaphragm 6. The hydraulic volume 8 is divided by a radially extending partition wall 12, which is part of housing part 4b, into a working chamber 14 and into a compensating chamber 16. The two chambers (14, 16) are connected to one another via an annular channel 18 in the partition wall 12.

The partition wall 12 has an opening, in which there is a membrane or diaphragm 20, which lies in a radial plane of the hydromount 2, being clamped between two components in the form of a lower grid plate 22 and an upper grid plate 24. FIG. 1 and the subsequent FIGS. show a coordinate system in which the axial direction of the mount, which extends from the top downward in the mount, is denoted by the z axis 26 of a Cartesian coordinate system; the x axis 27 and the y axis 28 of the Cartesian coordinate system define a radial plane of the hydromount 2; thus, when a radial direction is referred to, this is a direction in the radial xy plane of the mount. The two grid plates 22 and 24 are pressed between the two housing parts 4a and 4b in the axial direction of the hydromount 2 in a manner known per se, the pressing force being exerted on the upper grid plate 24 from the direction of housing part 4a via the supporting spring 10. The diaphragm 20 is clamped between the two grid plates (22, 24) in such a way that, as a consequence of the pressure on the two grid plates (22, 24) in the axial direction of the hydromount 2 and as a consequence of the clamping of the diaphragm 20 between the two grid plates (22, 24), a pretension in the diaphragm is obtained in the radial direction (the pretension in the diaphragm in the radial direction of the hydromount is referred to below as radial pretension). The way in which a radial pretension is produced in the diaphragm will be explained below in conjunction with the following FIGS.

Figure 2:
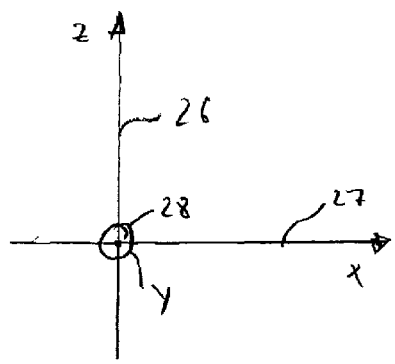
FIG. 2 shows a detail of FIG. 1.
Figure 2:
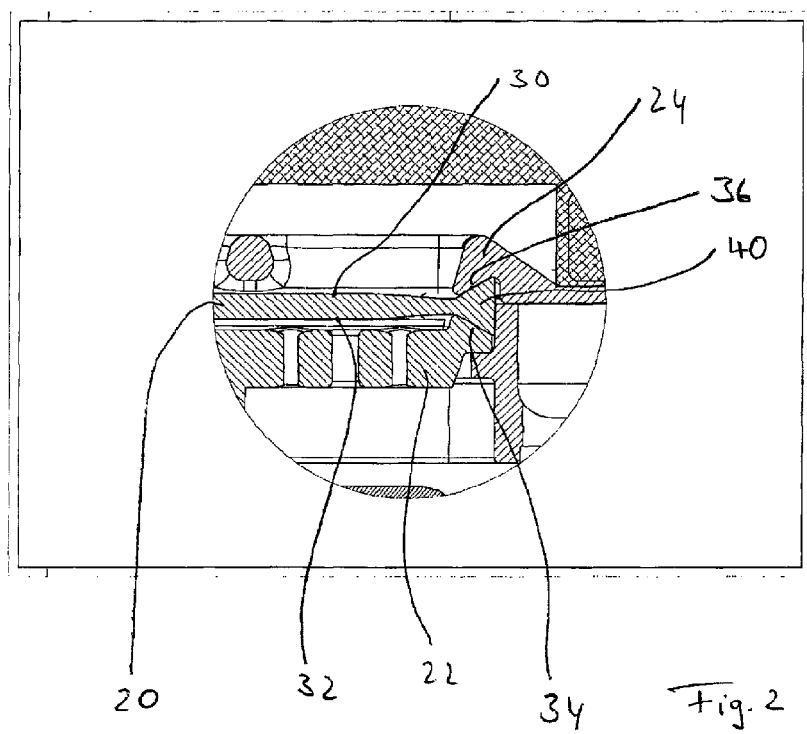

FIG. 2 shows the detail indicated by II in FIG. 1 on an enlarged scale. The diaphragm 20 has an annular bead 40, which projects beyond the upper surface 30 of the diaphragm 20, on the one hand, and beyond the lower surface 32 of the diaphragm, on the other hand, in the axial direction of the diaphragm. The annular bead 40 can be of any desired shape. In the embodiment shown, the bead 40 is designed in such a way that the thickness of the diaphragm 20 in the region of the bead increases radially from the inside to the outside. Thus, both the upper part of the bead 40 and the lower part of the bead 40 have the form of an oblique plane, the highest point of which is in each case radially on the outside.

The diaphragm 20 is clamped with the bead 40 between the two grid plates 22 and 24. At the radially outer edge thereof, both the lower grid plate 22 and the upper grid plate 24 have respective annular oblique planes 34 and 36. The diaphragm 20 is placed between the two grid plates (22, 24) in such a way that the annular bead 40 rests against oblique plane 36, on the one hand, and against oblique plane 34, on the other hand. Pressing the two grid plates (22, 24) in the axial direction forces the annular bead 40 of the diaphragm 20 radially outward in a radial direction. This leads to a radial pretension of the diaphragm 20 owing to the clamping of the diaphragm 20 between the two grid plates (22, 24). The degree of radial pretension in the diaphragm 20 can be adjusted via the distance by which the two grid plates (22, 24) are pressed in the axial direction. In this arrangement, the grid plates (22, 24) and the thickness of the diaphragm 20 are dimensioned in a manner known per se such that the diaphragm 20 can oscillate over a certain distance even when clamped between the two grid plates (22, 24) and is limited in its oscillation by the two grid plates (22, 24) only when this distance is exceeded.

The two surfaces (30, 32) of the diaphragm and hence also the entire surface of the bead 40 can be coated with a lubricant, to enable the bead 40 to slide more easily over the oblique planes (34, 36) during the application of axial pressure on the grid plates (22, 24). The surfaces (30, 32) are preferably coated with the lubricant by adding to the elastomeric material of the diaphragm 20, during the production of the diaphragm, an additive which migrates to the surfaces (30, 32) after vulcanization of the diaphragm 20.

Figure 3A:
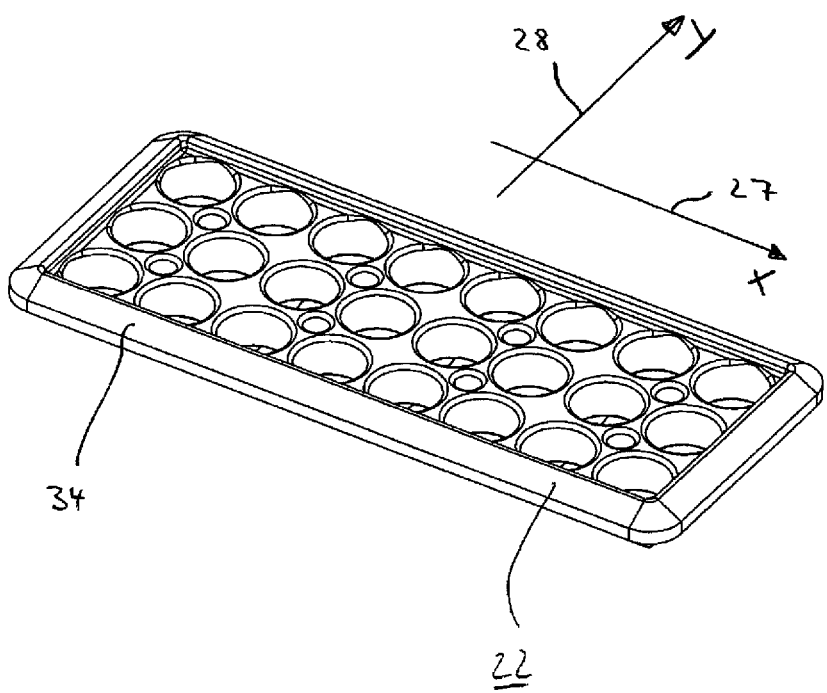
FIGS. 3a and 3b show a displacement limiting element in the form of a grid plate.
Figure 3B:
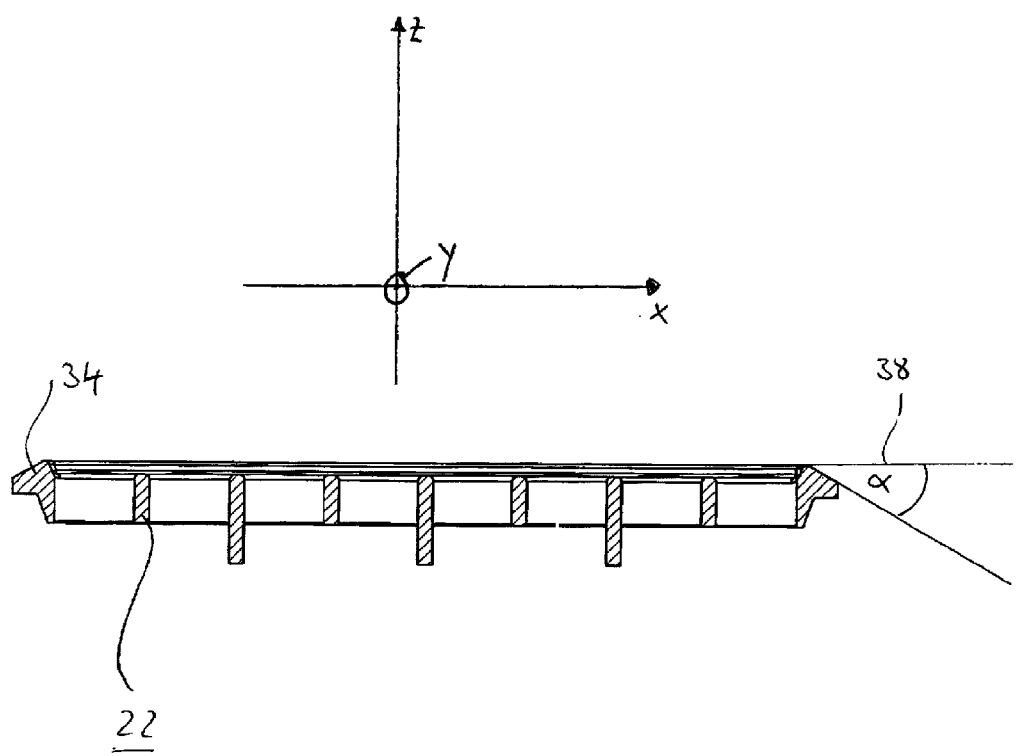

FIGS. 3a and 3b show the lower grid plate 22, with FIG. 3a showing a perspective view and FIG. 3b showing a longitudinal section of the grid plate 22. The annular oblique plane 34 and the straight line 38 extending in the radial direction of the hydromount include an angle a of between 30° and 60°.

Figure 4A:
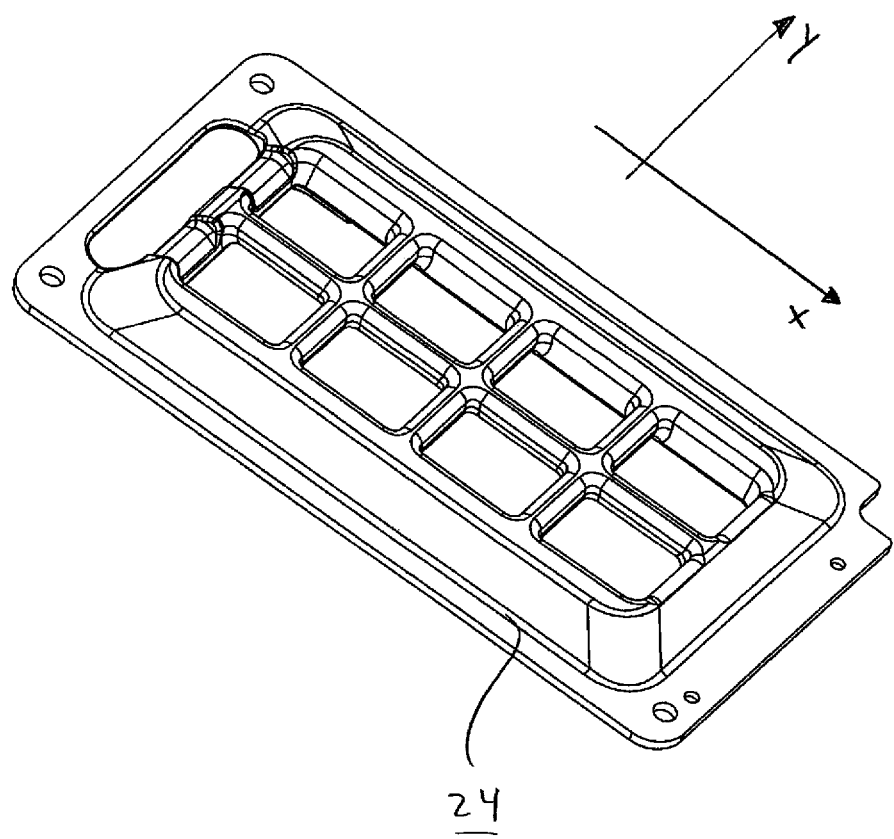
FIGS. 4a and 4b show a displacement limiting element in the form of a grid plate.
Figure 4B:
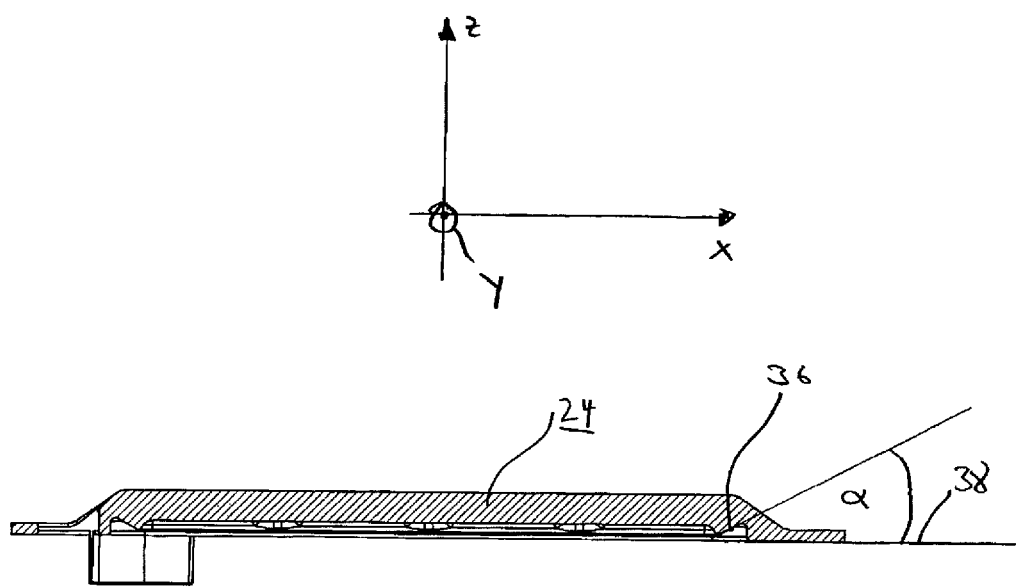

FIGS. 4a and 4b show the upper grid plate 24, with FIG. 4a showing a perspective view and FIG. 4b showing a longitudinal section of the grid plate 24. The annular oblique plane 36 and the straight line 38 pointing in the radial direction of the hydromount include an angle a of between 30° and 60°.

Figure 5A:
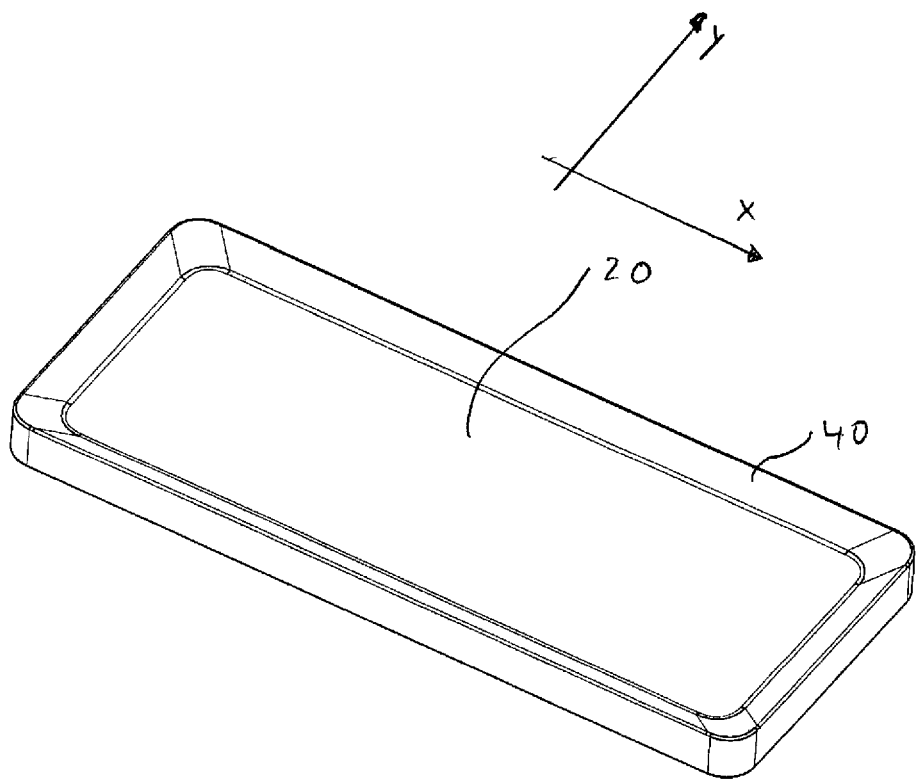
FIGS. 5a and 5b show a diaphragm.
Figure 5B:
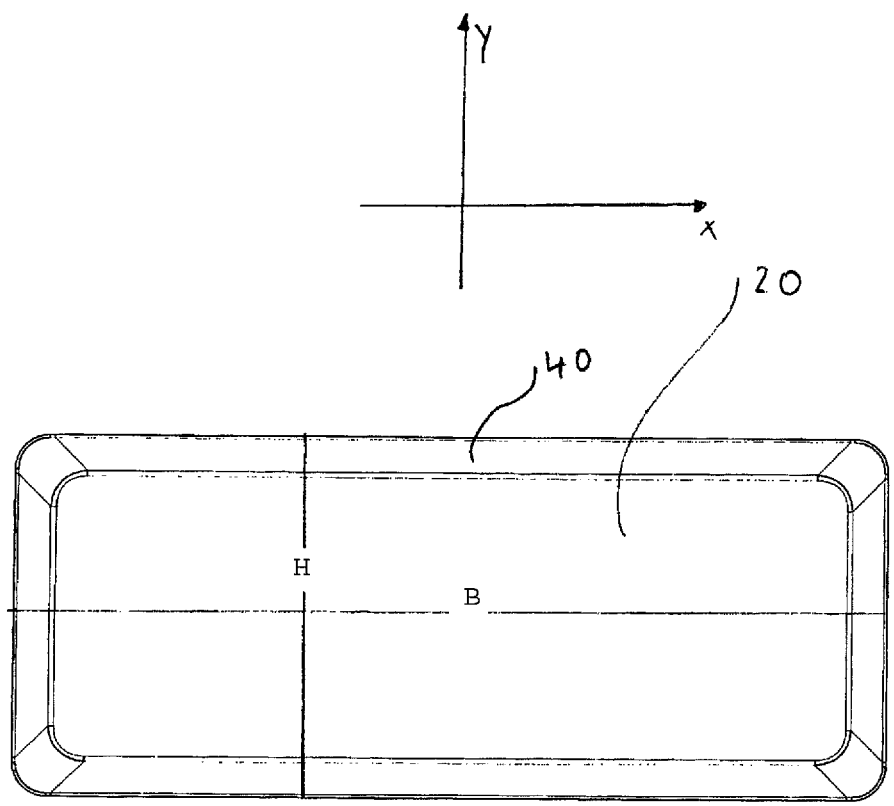

FIGS. 5a and 5b show the diaphragm 20, with FIG. 5a showing a perspective view of the diaphragm and FIG. 5b showing a plan view of the diaphragm 20. As shown in FIG. 2, the annular bead 40 rests on the annular oblique plane 36 of the upper grid plate 22 and on the lower oblique plane 34 of the lower grid plate 22. The diaphragm 20 has an approximately rectangular shape with rounded corners. The two principal directions of expansion of the diaphragm are the width B and the height H. Pressing the diaphragm 20 between the grid plates (22, 24) (see FIGS. 1 and 2) pretensions the diaphragm radially in such a way that the ratio of the length of the unpretensioned diaphragm 20 in one principal direction of expansion to the additional length produced by the pretension is between 30:1 and 50:1.

EXAMPLE

Width B of the unpretensioned diaphragm: 90 mm
Additional width δB produced by the pretension: 2 mm
Ratio B/δB: 45:1
Height H of the unpretensioned diaphragm: 60 mm
Additional height δH produced by the pretension: 2 mm
Ratio H/δH: 30:1

In the principal direction of expansion referred to as "width", the percentage pretension is therefore about 2.2%, whereas the radial pretension in the diaphragm 20 in the principal direction of expansion referred to as "height" is about 3.3%. In the case of the rectangular diaphragm 20 shown, the amount of radial pretension thus differs in percentage terms in the principal directions of expansion.

FIGS. 6a and 6b show an alternate embodiment for the grid plates (22, 24) and for the diaphragm 20. FIG. 6a shows the two grid plates (22, 24) and the diaphragm 20 in between the latter before the clamping of the diaphragm 20. The diaphragm 20 is of cup-shaped design with an annular wall 42. The wall 42 is slotted into an annular groove 44 in the upper grid plate 24. The groove 44 surrounds a recess 46, which is covered by the diaphragm 20 extending in the radial direction. The lower grid plate 22 has an annular projection 48, the outside diameter d of which corresponds approximately to the inside diameter D minus twice the thickness X of the diaphragm 20; d=D−2X.

FIG. 6b shows the two grid plates (22, 24) when installed in the hydromount 2 (see FIG. 1) with the diaphragm 20 in between. The lower grid plate 22 engages into the cup-shaped recess 46 in the manner of a cover by means of the annular projection 48. The diaphragm situated between the grid plates (22, 24) is pretensioned radially by the insertion of the annular projection 48 into the recess 46. In this arrangement, the degree of radial pretension can be adjusted by way of the height of the projection 48.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description 2 hydromount
4 housing
4a, 4b housing parts
6 compensating diaphragm
8 hydraulic volume
10 supporting spring
12 partition wall
14 working chamber
16 compensating chamber
18 annular channel
20 diaphragm/membrane
22 lower grid plate
24 upper grid plate
26 z axis
27 x axis
28 y axis
30 upper surface
32 lower surface
34 oblique plane
36 oblique plane
38 straight line
40 bead
42 wall
44 groove
46 recess
48 projection

What is claimed is:

1. A hydromount for a motor vehicle comprising:
a housing defining a longitudinal axis;
a compensating diaphragm;
said housing and said compensating diaphragm conjointly enclosing a hydraulic volume;
a partition wall partitioning said hydraulic volume into a working chamber and a compensating chamber;
said partitioning wall having a transfer channel interconnecting said working chamber and said compensating chamber;
a membrane of flexible elastomeric material;
said partitioning wall having an opening for accommodating said membrane;
first and second components arranged in said wall transverse to said axis and disposed in spaced relationship to one another to define an adjustable gap therebetween;
said membrane having a peripheral edge disposed in said gap;
said first and second components clamping said membrane at said peripheral edge thereof so as to impart a radial pretensioning to said membrane adjusted via the distance by which said components are pressed toward each other along said axis to narrow said gap; and,
said membrane having a non-circular shape so as to have a principal direction of expansion defining a first percentage of pretension and a secondary direction of expansion defining a second percentage of pretension greater than said first percentage of pretension when said membrane is clamped between said first and second components whereby structure borne vibration is damped.

2. The hydromount of claim 1, wherein said first component and said second component are respective grid plates configured to limit the deflection of said diaphragm.

3. The hydromount of claim 1, wherein:
said membrane has two surfaces and said peripheral edge is formed as an annular bead projecting above at least one of said surfaces;
one of said components faces said one surface of said membrane;
said one component facing said one surface is configured to have a peripheral annular oblique plane lying opposite said annular bead; and,
said annular oblique plane is configured to clamp said annular bead.

4. The hydromount of claim 3, wherein said annular bead projects beyond both of said two surfaces of said membrane;
said first component and said second component face respective ones of said surfaces and have respective annular oblique planes;
said annular oblique planes are configured to clamp said annular bead.

5. The hydromount of claim 4, wherein each of said oblique planes have an angle between 30° and 60°.

6. The hydromount of claim 3, wherein said oblique plane has an angle between 30° and 60°.

7. The hydromount of claim 3, wherein said flexible elastomeric material of said membrane includes an additive configured to migrate to said surfaces of said membrane after vulcanization of said membrane and act as a lubricant.

8. The hydromount of claim 1, wherein said membrane has two surfaces coated with a lubricant.

9. The hydromount of claim 1, wherein said membrane has a rectangular shape.

10. A hydromount comprising:
a housing;
a compensating diaphragm;
said housing and said compensating diaphragm conjointly enclosing a hydraulic volume;
a partition wall partitioning said hydraulic volume into a working chamber and a compensating chamber;
said partitioning wall having a transfer channel interconnecting said working chamber and said compensating chamber;
a membrane of flexible elastomeric material;
said partitioning wall having an opening for accommodating said membrane;
first and second components for clamping said membrane therebetween so as to impart a radial pretensioning to said membrane; and,
said membrane having principal directions of expansion; and,
a ratio of length of the unpretensioned membrane in one of said principal directions of expansion to the additional length produced by the pretension in said one principal direction lying in a range between 30:1 and 50:1.

11. The hydromount of claim 10, wherein said membrane is configured to have differing amounts of pretension in said principal directions of expansion of said membrane.

12. A hydromount for a motor vehicle comprising:
a housing defining a longitudinal axis;
a compensating diaphragm;
said housing and said compensating diaphragm conjointly enclosing a hydraulic volume;
a partition wall partitioning said hydraulic volume into a working chamber and a compensating chamber;
said partitioning wall having a transfer channel interconnecting said working chamber and said compensating chamber;
a membrane of flexible elastomeric material;
said partitioning wall having an opening for accommodating said membrane;
first and second components arranged in said wall transverse to said axis and disposed in spaced relationship to one another to define an adjustable gap therebetween;
said membrane having a peripheral edge disposed in said gap;
said first and second components clamping said membrane at said peripheral edge thereof so as to impart a radial pretensioning to said membrane adjusted via the distance by which said components are pressed toward each other along said axis to narrow said gap without coming in direct mutual contact engagement; and,
said membrane having a non-circular shape so as to have a principal direction of expansion defining a first percentage of pretension and a secondary direction of expansion defining a second percentage of pretension greater than said first percentage of pretension when said membrane is clamped between said first and second components whereby structure borne vibration is damped.

13. The hydromount of claim 12, wherein said membrane has a rectangular shape.

14. A hydromount comprising:
a housing defining a longitudinal axis;
a compensating diaphragm;
said housing and said compensating diaphragm conjointly enclosing a hydraulic volume;
a partition wall partitioning said hydraulic volume into a working chamber and a compensating chamber;
said partitioning wall having a transfer channel interconnecting said working chamber and said compensating chamber;
a membrane of flexible elastomeric material;
said partitioning wall having an opening for accommodating said membrane;
first and second components arranged in said wall transverse to said axis and disposed in spaced relationship to one another to define an adjustable gap therebetween;
said membrane having a peripheral edge disposed in said gap;
said first and second components clamping said membrane at said peripheral edge thereof so as to impart a radial pretensioning to said membrane adjusted via the distance by which said components are pressed toward each other along said axis to narrow said gap;
said membrane having upper and lower surfaces extending into said peripheral edge; and,
said flexible elastomeric material of said membrane including an additive configured to migrate to said surfaces of said membrane after vulcanization of said membrane and act as a lubricant.

* * * * *

UNITED STATES PATENT AND TRADEMARK OFFICE
CERTIFICATE OF CORRECTION

PATENT NO. : 9,784,334 B2
APPLICATION NO. : 13/090872
DATED : October 10, 2017
INVENTOR(S) : F. Reinke et al.

It is certified that error appears in the above-identified patent and that said Letters Patent is hereby corrected as shown below:

In Column 5:
Line 2: delete "a" and substitute -- α -- therefor.
Line 8: delete "a" and substitute -- α -- therefor.

Signed and Sealed this
Nineteenth Day of December, 2017

Joseph Matal
*Performing the Functions and Duties of the
Under Secretary of Commerce for Intellectual Property and
Director of the United States Patent and Trademark Office*